Feb. 11, 1930.  L. B. GAMEL  1,746,998
METHOD OF AND MACHINE FOR REMOVING WIRE
CORES FROM THE BEADS OF RUBBER TIRES
Filed Feb. 10, 1927  4 Sheets-Sheet 4
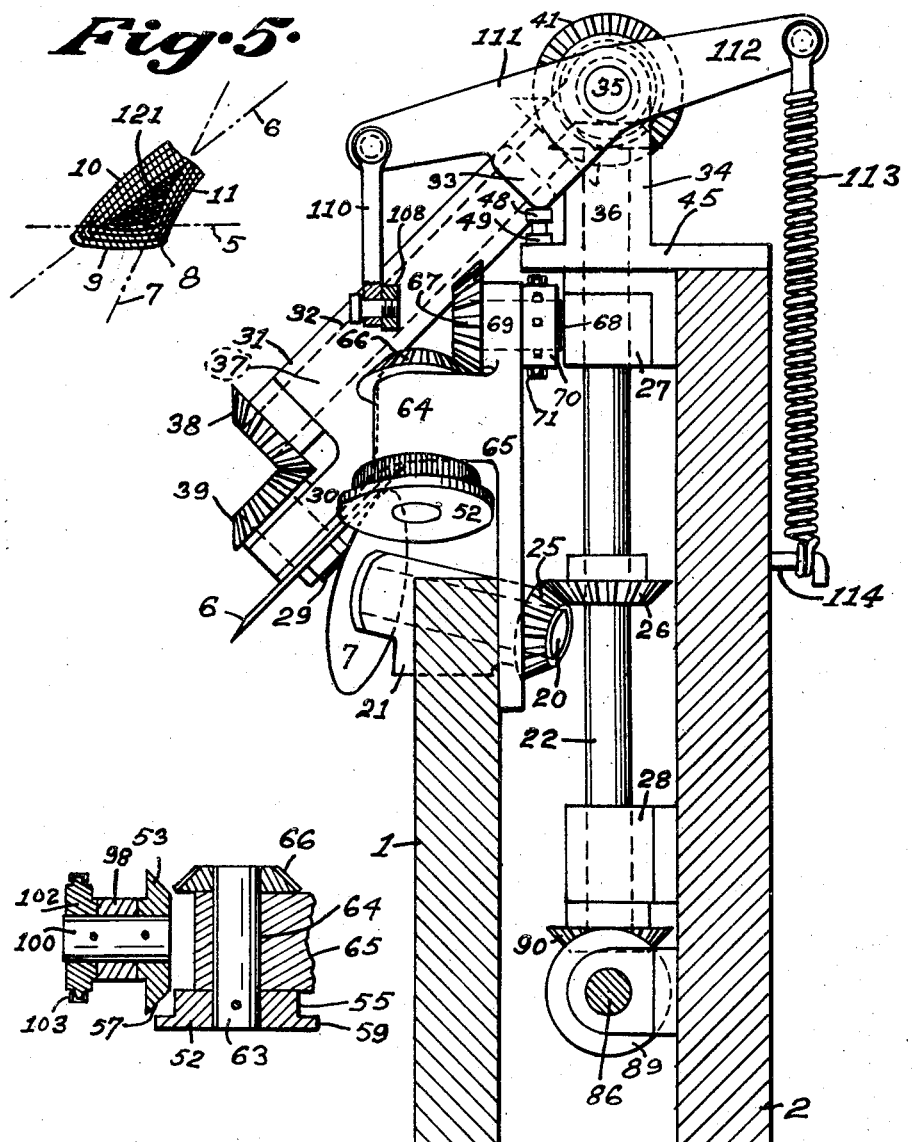
Inventor:
Lee B. Gamel,
By Hugh K. Wagner,
Attorney.

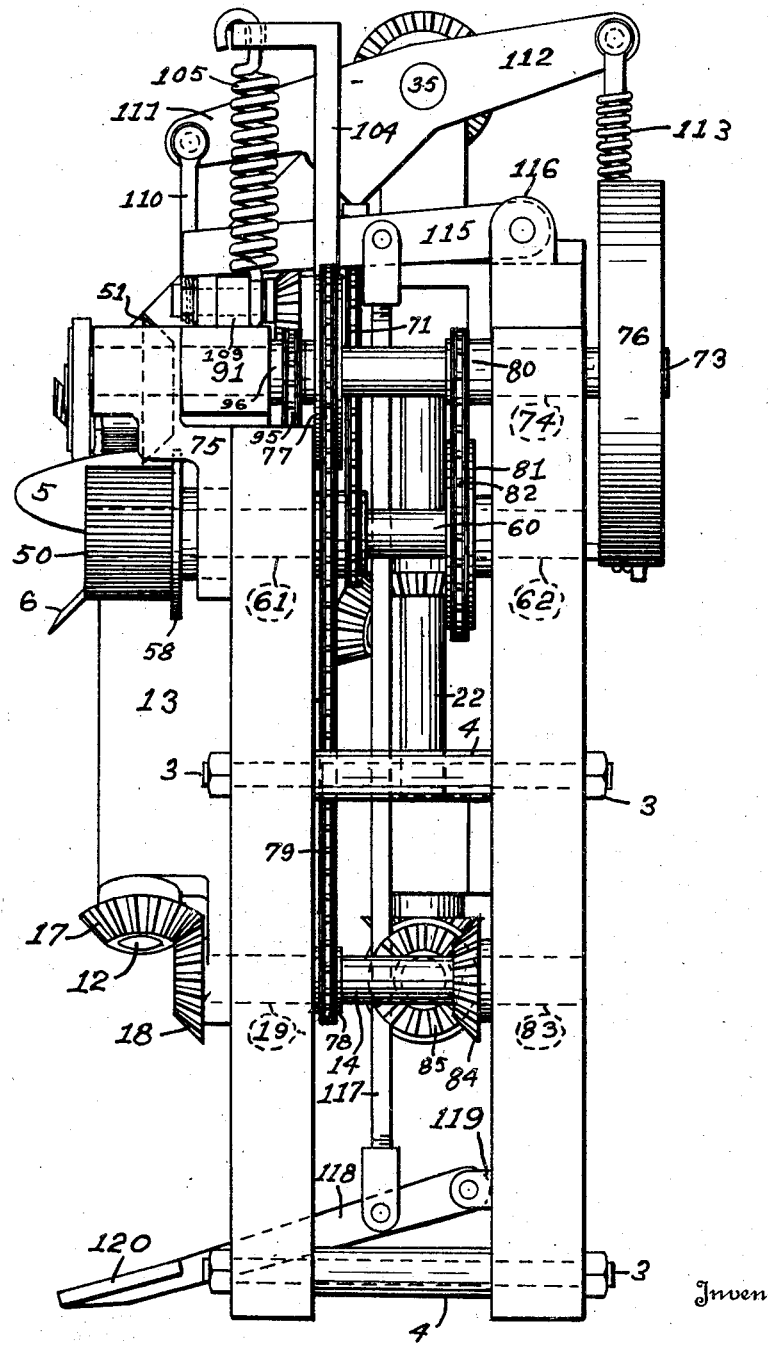

Patented Feb. 11, 1930

1,746,998

UNITED STATES PATENT OFFICE

LEE B. GAMEL, OF ST. LOUIS, MISSOURI, ASSIGNOR TO GAMEL BEAD DECORING COMPANY, OF PEORIA, ILLINOIS, A CORPORATION OF ILLINOIS

METHOD OF AND MACHINE FOR REMOVING WIRE CORES FROM THE BEADS OF RUBBER TIRES

Application filed February 10, 1927. Serial No. 167,342.

This invention relates to a method of and a machine for removing the reinforcing wire core from the beads of the casings of discarded rubber tires so as to render them salable for salvage purposes.

It is the practice to recover the rubber from such discarded casings by the use of reagents that disintegrate the fabric from the rubber. Owing to the fact, however, that the reagents react, also, on the wire core, it is necessary to cut the bead that contains the core from the body of the casing, so that all the rubber except that of the bead may be recovered. This invention purposes to separate the wire core of the bead mechanically from the composite shell of rubber and fabric with which it is surrounded, so that the reagents may then, also, be applied to the coreless bead to recover the rubber therefrom. On account of the toughness of the shell, however, it is impractical to cut the shell by hand or by the use of ordinary methods, since the amount of time and effort expended to effect the separation of core and shell in this manner is prohibitive.

Accordingly, the principal aim of this invention is to provide a method of and means for effecting the separation accurately and expeditiously. To this end, the method of this invention is to cut the bead longitudinally and on a plurality of intersecting planes to the transverse section of the wire core, the shell being preferably pared from the core on three different sides of the latter. The cutting blades are preferably power-driven, and accuracy is assured by advancing them against the side of the core as a guide.

Briefly described, the machine comprises preferably a plurality of power-driven cutting discs that cut the bead on the intersecting planes, and means for guiding and advancing the bead against the discs. Means are, also, preferably provided for expeditiously shifting the position of one or more of the discs or guiding means wherever such shifting is necessary to insert or remove a bead from the machine. Other objects and advantages will appear in the course of the following description of a preferred embodiment of this invention.

While the invention includes the combined instrumentalities above mentioned, it is believed that the aforesaid means are not only combinatively novel, but certain of the devices going to make up such means are new in less combinations than the whole, and some are capable of individual use, as will more clearly appear hereinafter.

In the accompanying drawings forming part of this specification, in which like numbers of reference denote like parts wherever they occur, Figure 1 is a side elevation of a machine constructed in accordance with this invention;

Figure 4 is an end elevation of that end of the machine that appears at the right in Figure 1;

Figure 5 is a transverse section through a tire bead to illustrate the manner in which the bead is cut to remove the core therefrom;

Figure 6 is a fragmentary sectional view taken on the line 6—6 in Figure 1; and

Figure 7 is a vertical transverse sectional view taken approximately on the line 7—7 in Figure 1.

Figure 1:
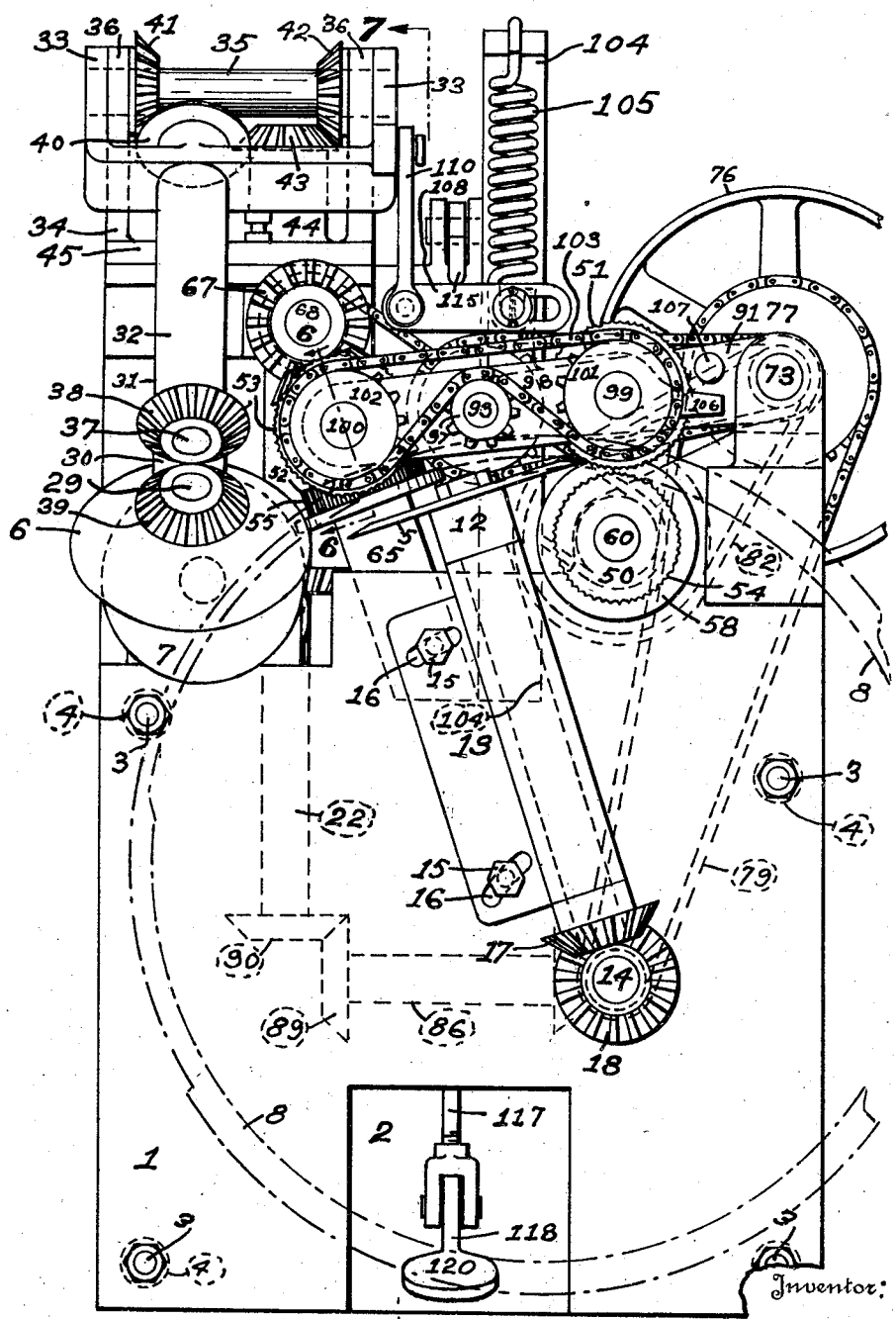

The illustrated embodiment of the invention comprises a pair of side frames 1 and 2, connected together by bolts 3, extending through tubular spacers 4. A plurality of disc cutters 5, 6, and 7 are adapted to pare off circular portions of the bead 8 at different tangents to the transverse section of the core, as shown diagrammatically in Figure 5, cutter 5 paring off the underside 9 of the bead, cutter 6 the inclined upper or outer side 10, and cutter 7 the inner side 11. Cutter blade 5 is arranged intermediately of the length of the machine, and cutter blades 6 and 7 are disposed at the left end thereof. The blades 5, 6, and 7 are so inclined that they enter the bead at an acute angle to its length, an angle of substantially twenty degrees being best.

Blade 5 is detachably secured to the upper end of an arbor 12, journaled in a bracket 13, adjustable about the axis of a horizontal transverse shaft 14, and secured in its adjusted position by means of screws 15, passing through slots 16 in the bracket 13 and threading into the outer side of the frame 1. A bevel gear 17, affixed to the lower end of arbor 12, meshes with bevel gear 18, affixed to the near end of the shaft 14 that projects outwardly beyond its bearing 19 in the frame 1.

Blade 7 is detachably secured to the outer end of an arbor 20, journaled in a bearing block 21, adjustable about the axis of a vertical shaft 22, and secured in its adjusted position by means of screws 23, passing through slots 24 in the block 21 and threading into the upper face of the frame 1. A bevel gear 25, affixed to the inner end of arbor 20, meshes with a bevel gear 26, affixed to the shaft 22, journaled in bearings 27 and 28, borne by the inner side of the frame 2.

Blade 6 is detachably secured to the outer end of an arbor 29, journaled in a bearing arm 30, forming part of a bracket 31, that, also, comprises a bearing sleeve 32, and arms 33 at its upper end that straddle a U-shaped frame 34, and that are pivoted on a shaft 35 that is journaled in the upright arms 36 of the frame 34. A shaft 37, journaled in the bearing 32, has affixed to its lower end a bevel gear 38, that meshes with bevel gear 39, affixed to inner end of the arbor 29. A bevel gear 40, affixed to the upper end of shaft 37, meshes with bevel gear 41, affixed to shaft 35, and a bevel gear 42, affixed to the shaft 35, meshes with bevel gear 43, affixed to the upper end of shaft 22, which is journaled in a bearing sleeve 44, formed integral with, and projecting upwardly from, the base 45 of the frame 34. Frame 34 is adjustable about the shaft 22, being secured in its adjusted position by means of screws 46, that pass through slots 47 in the base 45 and that thread into the upper side of the frame 2. A set screw 48, threading into the base 45, and having a locknut 49, forms an adjustable stop that abuts against one of the arms 33 to limit the descent of the bracket 31 about its pivot 35.

Means are provided for guiding the bead toward the cutters 5, 6, and 7. The said means are, also, preferably so arranged that they may be power-driven and advance the bead positively against the said cutters, as well as guide it thereto. The means employed to guide and advance the bead preferably comprises two pairs of rotary elements or rollers, each pair of which is adapted positively to engage opposite sides of the bead 8 to clamp the same therebetween. The first pair of rollers 50 and 51 co-operate to advance the bead 8 toward the left against the disc 5, and the second pair of rollers 52 and 53 co-operate to advance the bead 8 against the discs 6 and 7. The annular surfaces 54 and 55, respectively, of rollers 50 and 52, and the conical surfaces 56 and 57, respectively, of the rollers 51 and 53 are corrugated to prevent slippage of the bead therebetween. Rollers 50 and 52 are provided with flanges 58 and 59, respectively, that react against the pressure exerted on the bead by the rollers 51 and 53, respectively.

Roller 50 is affixed to a shaft 60, journaled in bearings 61 and 62 in the frames 1 and 2, respectively. Roller 52 is affixed to the lower end of a shaft 63, journaled in a bearing 64 on a bracket 65, suitably secured to the inner side of the frame 1. A bevel gear 66 is affixed to the upper end of shaft 63, and meshes with a bevel gear 67, affixed to one end of a shaft 68, journaled in a horizontal bearing 69 on the bracket 65. A sprocket wheel 70 is affixed to the other end of the shaft 68, and is driven by a sprocket chain 71, driven by a sprocket wheel 72, affixed to the shaft 60.

A drive shaft 73 is journaled in a bearing 74 in the frame 2, and in a bracket 75, secured to the outer side of the frame 1. The shaft 73 may be driven from any suitable source of power, preferably transmitted through a belt to a pulley 76, affixed to the shaft 73 at the outer side of the frame 2. A sprocket wheel 77, affixed to shaft 73, drives sprocket wheel 78, affixed to shaft 14, through the intermediacy of sprocket chain 79. Another sprocket wheel 80, affixed to shaft 73, drives sprocket wheel 81, affixed to shaft 60, through the intervention of sprocket chain 82. The far end of shaft 14 is journaled in a bearing 83, formed in the frame 2; and a bevel gear 84, affixed to shaft 14 adjacent the inner end of the bearing 83, meshes with a bevel gear 85, affixed to a shaft 86, journaled in bearings 87 and 88, borne by the inner side of the frame 2. Motion is transmitted from shaft 86 to shaft 22 by means of intermeshing bevel gears 89 and 90, affixed to the shafts 86 and 22, respectively.

Figure 2:
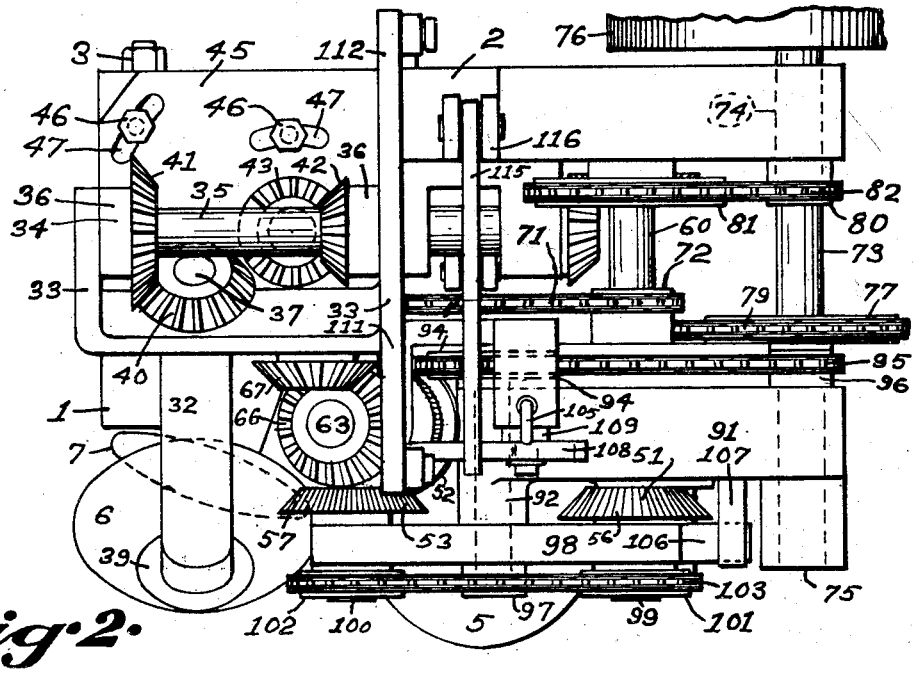
Figure 2 is a plan view of the same.
Figure 3:
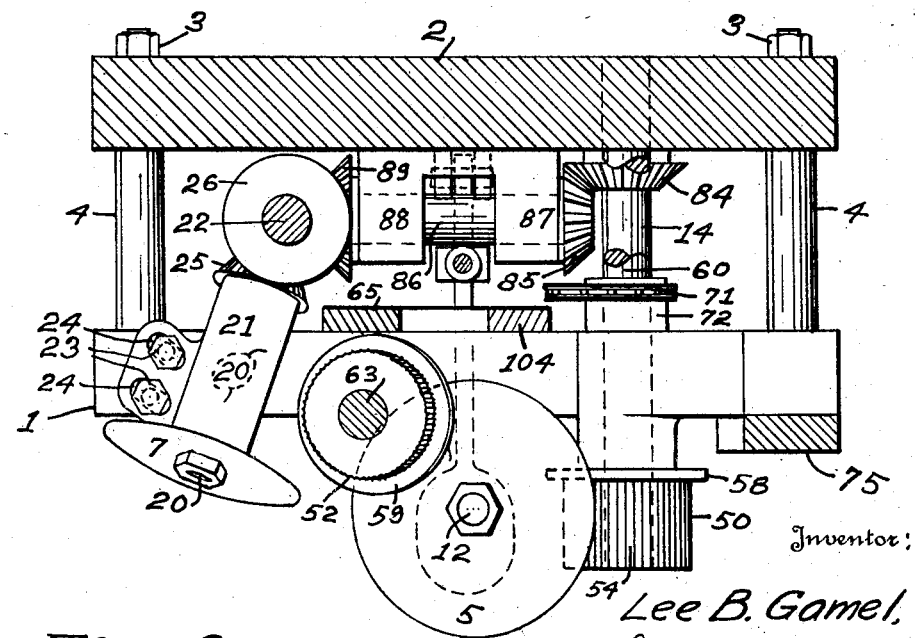
Figure 3 is an approximately horizontal sectional view that is taken so as to exhibit the parts that operate against the lower sides of the bead.

An arm 91, pivotally borne by the shaft 73, extends to the left over the disc 5, where it is formed into a bearing 92, in which is journaled a shaft 93, having affixed to its inner end a sprocket wheel 94, which is driven through sprocket chain 95 by a sprocket wheel 96, affixed to the shaft 73. A sprocket wheel 97 is affixed to the outer end of shaft 93; and an arm 98 is pivotally mounted on the shaft 93 intermediary of the arm 91 and the sprocket wheel 97. Arm 98 extends both to the right and to the left of the shaft 93; and horizontal shafts 99 and 100 are journaled transversely in the right and left ends, respectively, of the arm. Roller 51 is affixed to the inner end of shaft 99; and sprocket wheel 101 is affixed to the outer end of the shaft. Roller 53 is affixed to the inner end, and sprocket wheel 102 to the outer end, of the shaft 100. Sprocket wheels 101 and 102 are driven by sprocket wheel 97 through a sprocket chain 103, that passes thereover. Disc 5 should rotate in a counter-clockwise direction as viewed in Figure 2; and discs 6 and 7 in a clockwise direction, as viewed in Figure 1, so that the discs will tend to force the bead against the flanges 58 and 59. If the disc 5 is eight inches in diameter, the discs 6 and 7 are respectively seven and one-half and six and one-half inches in diameter, so that when the larger disc becomes smaller in diameter because of continued resharpening, it may be used to replace the smaller discs 6 and 7 when the latter become unfit for further use. The rollers 50, 51, 52, and 53 are preferably about four inches in diameter, and rotate in such respective directions that they advance the bead from right to left as viewed in Figure 1. The aforesaid gearing is so proportioned and arranged that the rollers 50, 51, 52, and 53 rotate through about fifty-five revolutions a minute in the proper direction while the disc 5 rotates through about five hundred fifty revolutions a minute in the indicated direction, the smaller discs 6 and 7 rotating at the same peripheral speed as the disc 5. The rollers are so arranged with relation to the cutting discs that they will advance the bead longitudinally against the annular cutting edges of the discs and substantially diametrically thereof, or as nearly as practicable toward the axes of the discs. With this relation of the cutting edges to the bead, a minimum length of cutting edge intersects the bead, so that the friction between the bead and the discs is much less than if a greater length of cutting edge were engaged by the bead.

An L-shaped bracket 104 is secured to the inner side of the frame 1 and extends upwardly, and then projects horizontally over the arm 91. A spring 105, having its upper end connected to the horizontal portion of the bracket 104, and its lower end to the arm 91, tends to lift the arm 91 and with it arm 98 and the rollers 101 and 102 from their operating position. The rotation of sprocket wheel 97 and shaft 93, however, tends to tilt the arm 98 in a counter-clockwise direction when it is lifted; and, to limit the motion of the arm 98 about the shaft 93 and prevent undue tilting, arm 98 is provided with a projection 106 that engages a projection 107 on the arm 91. A horizontal link 108 is pivoted at one end to a lug 109 on the upper side of arm 91, and at its other end to the lower end of a vertical link 110, whose upper end is pivoted to an arm 111 that projects from the near arm 33 of the pivoted frame 31 toward the left, as viewed in Figure 7. Another arm 112 projects from the said arm 33 toward the right, where it is pivotally connected to the upper end of a spring 113, whose lower end is connected to a projection 114 on the outer side of the frame 2. Spring 113 tends to lift cutter 6 away from the bead 8. A lever 115, pivoted to a lug 116 on the upper side of the frame 2, has its free end resting on the link 108, and is pivoted intermediately to the upper end of a vertical link 117, whose lower end is pivoted to the intermediate portion of a foot pedal lever 118, the inner end of which is pivoted to a lug 119, borne by the inner side of the frame 2, and the outer end 120 of which is of pedal formation.

The construction of the machine having been fully described, its operation will be readily understood. Spring 105 normally maintains rollers 51 and 53 in an elevated position, and spring 113 normally holds disc 6 outwardly and upwardly, so that they offer no obstruction when the operator places the bead 8 on the rollers 50 and 52. Both springs normally hold the pedal 120 in its elevated position. Power is applied to the pulley 76 to set the machine in operation; the operator places a bead in position on the rollers 50 and 52 and then depresses the pedal 120, causing disc 6 and rollers 51 and 53 to descend on the upper side of the bead, the rollers 51 and 53 co-operating with the rollers 50 and 52 to advance the bead against the cutting blades 5, 6, and 7, and the disc 6 entering the bead until it reaches the wire core. The comparative pull of the springs 105 and 113 with relation to one another is such that spring 105 lifts rollers 51 and 53 before spring 113 lifts cutter disc 6. Lever 115 bears on link 108 at a point such that the pressure that the operator exerts on the foot pedal is distributed in proper proportion to the rollers 51 and 53 and the cutter 6. The blades 5, 6, and 7 are hard enough to pierce the shell of fabric and rubber that surrounds the wire core 121, but they can not pass through the wire core and their cutting edges merely ride along the same so that the core acts as a guide. The paring action of the cutters, also, exerts a lateral tension on the portion of the shell that is about to be severed, so that even if the cutters do not intimately meet the core at all points, the shell will be entirely separated from the core. When the bead has been revolved until the entire shell has been pared off, the operator releases the foot pedal, thereby raising rollers 51 and 53 and disc 6, so that the wire core may be removed and a fresh bead placed on the rollers 50 and 52, when the foregoing cycle of operations will be repeated.

It will be observed that, since the positioning of the rollers 51 and 53 and the cutter 6 is foot-controlled, the operator's hands are entirely free to insert the bead and remove the core after the operation, thereby increasing the output of the machine. It will, also, be observed that the cutters 5, 6, and 7 may be adjusted into the most favorable operating position with relation to the rollers and, also, to compensate for reduction in the diameter of the cutters due to frequent sharpening of their edges. It will be understood that a lubricant and cooling medium, such as water, will be automatically supplied to the blades 5, 6, and 7; and that the blades and gears will, also, be provided with suitable guards to prevent injury to the operator. The pivotal connections of link 110 to link 108 and arm 111, respectively, are sufficiently loose to permit an ample universal movement thereat and prevent binding due to the fact that arm 111 and link 108 swing in different planes that are at right angles to one another. Sufficient looseness is, also, permitted at all other connections in this machine where freedom of movement requires it.

Having thus fully described this invention, I hereby reserve the benefit of all changes in form, arrangement, order, or use of parts, as it is evident that many minor changes may be made therein without departing from the spirit of this invention or the scope of the following claims.

I claim:—

1. The method of removing comparatively soft surrounding material from the harder core in the beads of tires, which consists in introducing a rotating severing disc at an incline to the adjacent portion of the bead into the soft material until it bears against the core, and then advancing the bead longitudinally against the edge of the disc while pressing the latter against the harder core.

2. The method of removing comparatively soft surrounding material from the harder core in the beads of tires, which consists in introducing a rotating severing disc at an incline to the adjacent portion of the bead into the soft material until it bears against the core, and advancing the bead diametrically of the disc.

3. The method of removing the comparatively hard core from its softer surrounding material in the beads of tires, which consists in annularly slicing the softer material in planes corresponding to the faces of the core to produce a plurality of rings of the approximate diameter of said core.

4. The method of removing the comparatively hard core from its softer surrounding material in the beads of tires, which consists in paring off an annular portion of soft material along one side of the core, a second annular portion for the remaining portion along another side of the core and a third annular portion along the third side of the core.

5. A machine for removing comparatively soft surrounding material from the harder core in the beads of tires comprising angularly disposed severing means, and means for moving a bead with relation to the said severing means to pare off a portion of the soft material.

6. A machine for removing comparatively soft surrounding material from the harder core in the beads of tires comprising a rotary circular blade that is adapted to cut the soft material, and means for advancing the bead diametrically of the blade.

7. A machine for removing comparatively soft surrounding material from the harder core in the beads of tires comprising a rotary circular blade that is adapted to cut the soft material, and means for advancing the bead diametrically of the blade, and at an acute angle to the plane thereof.

8. A machine for removing comparatively soft surrounding material from the harder core in the beads of tires comprising means for cutting the soft material into a plurality of rings, and means for urging a bead transversely against the cutting means and simultaneously advancing the bead longitudinally thereagainst.

9. A machine for removing comparatively soft surrounding material from the harder core in the beads of tires comprising a rotary circular blade for cutting an annular ring from the soft material, and means for urging a bead transversely against the blade and simultaneously advancing the bead longitudinally thereagainst to pare off a portion of the soft material.

10. A machine for removing comparatively soft surrounding material from the harder core in the beads of tires comprising a blade for cutting the soft material, and means for advancing the bead diametrically of the blade.

11. A machine for removing comparatively soft surrounding material from the harder core in the beads of tires comprising a rotary circular blade for cutting the soft material, and means for advancing the bead diametrically of the edge of the blade.

12. A machine for removing comparatively soft surrounding material from the harder core in the beads of tires comprising a plurality of cutting means adapted to operate on different sides of the bead to pare off respective portions along the faces of the core.

13. A machine for removing comparatively soft surrounding material from the harder core in the beads of tires comprising a plurality of cutting means positioned in sequence along the bead and adapted to operate on different sides of the latter to pare off respective portions along the faces of the core.

14. A machine for removing comparatively soft surrounding material from the harder core in the beads of tires comprising a plurality of cutting means positioned in sequence along the bead and adapted to operate on different sides of the latter to pare off respective portions along the faces of the core, and a plurality of means for constraining the bead into predetermined positions with relation to the said cutting means.

15. A machine for removing comparatively soft surrounding material from the harder core in the beads of tires comprising a plurality of cutting means positioned in sequence along the bead and adapted to operate on different sides of the latter to pare off respective portions along the faces of the core, and a plurality of means juxtaposed to each of said cutting means for advancing the bead longitudinally thereagainst.

16. A machine for removing comparatively soft surrounding material from the harder core in the beads of tires comprising a pair of cutting means positioned in sequence along the bead and adapted to operate on different sides of the latter to pare off respective portions along the faces of the core, a pair of rotary elements adapted to guide the bead therebetween to the first of said cutting means, and a second pair of rotary elements adapted to guide the bead therebetween to the other of said cutting means, at least one rotary element of each pair of rotary elements being movable toward and away from the bead.

17. A machine for removing comparatively soft surrounding material from the harder core in the beads of tires comprising a pair of cutting means positioned in sequence along the bead and adapted to operate on different sides of the latter to pare off respective portions along the faces of the core, a pair of rotary elements adapted to guide the bead therebetween to the first of said cutting means, a second pair of rotary elements adapted to guide the bead therebetween to the other of said cutting means, at least one rotary element of each pair of rotary elements being movable toward and away from the bead, and voluntarily controlled means connected to both of said movable rotary elements for positioning them.

18. A machine for removing comparatively soft surrounding material from the harder core in the beads of tires comprising a pair of cutting blades positioned along the bead and adapted to operate on different sides of the latter to pare off respective portions along the adjacent faces of the core, and another cutting blade adapted to operate on a third side of the bead to pare off another portion of the bead along the adjacent face of the core, the said last-mentioned blade being shiftable toward and away from the bead.

19. A machine for removing comparatively soft surrounding material from the harder core in the beads of tires comprising a pair of cutting blades positioned along the bead and adapted to operate on different sides of the latter to pare off respective portions along adjacent faces of the core, another cutting blade adapted to operate on a third side of the bead to pare off another portion of the bead along the adjacent face of the core, the said last-mentioned blade being shiftable toward and away from the bead, and foot-controlled means for positioning the said last-mentioned blade.

20. A machine for removing comparatively soft surrounding material from the harder core in the beads of tires comprising a pair of rotary cutters positioned in sequence along the path of the bead and adapted to operate on different sides of the latter to pare off respective portions along the faces of the core, a pair of rotary elements adapted to guide the bead therebetween to the first of said cutters, a second pair of rotary elements adapted to guide the bead therebetween to the other of said cutters, and another rotary cutter adapted to operate on a third side of the bead to pare off another portion along the adjacent face of the core.

21. A machine for removing comparatively soft surrounding material from the harder core in the beads of tires comprising a pair of rotary cutters positioned in sequence along the path of the bead and adapted to operate on different sides of the latter to pare off respective portions along the adjacent faces of the core, a pair of rotary elements adapted to guide the bead therebetween to the first of said cutters, a second pair of rotary elements adapted to guide the bead therebetween to the other of said cutters, and another rotary cutter adapted to operate on a third side of the bead to pare off another portion along the adjacent face of the core, at least one of the said cutters being shiftable toward and away from the bead and at least one rotary element of each pair of said rotary elements being shiftable toward and way from the bead.

22. A machine for removing comparatively soft surrounding material from the harder core in the beads of tires comprising a pair of rotary cutters positioned in sequence along the path of the bead and adapted to operate on different sides of the latter to pare off respective portions along the adjacent faces of the core, a pair of rotary elements adapted to guide the bead therebetween to the first of said cutters, a second pair of rotary elements adapted to guide the bead therebetween to the other of said cutters, another rotary cutter adapted to operate on a third side of the bead to pare off another portion along the adjacent face of the core, at least one of the said cutters being shiftable toward and away from the bead and at least one rotary element of each pair of said rotary elements being shiftable toward and away from the bead, and voluntarily controlled means connected to the shiftable cutter and to both of said shiftable rotary elements for positioning them.

In testimony whereof I hereunto affix my signature.

LEE B. GAMEL.